United States Patent
Songa et al.

(10) Patent No.: US 11,769,417 B2
(45) Date of Patent: Sep. 26, 2023

(54) METHODS AND SYSTEMS FOR REPRESENTING FLIGHT MODE ANNUNCIATION INFORMATION ON A COCKPIT DISPLAY

(71) Applicant: HONEYWELL INTERNATIONAL INC., Morris Plains, NJ (US)

(72) Inventors: Anil Kumar Songa, Bangalore (IN); Sabu Mathew, Bangalore (IN); Suresh Bazawada, Bangalore (IN); Sadguni Venkataswamy, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/024,979

(22) Filed: Sep. 18, 2020

(65) Prior Publication Data
US 2022/0044576 A1    Feb. 10, 2022

(30) Foreign Application Priority Data
Aug. 5, 2020   (IN) .............................. 202011033473

(51) Int. Cl.
| G08G 5/00 | (2006.01) |
| G06F 3/14 | (2006.01) |
| B64D 45/00 | (2006.01) |
| B64D 43/02 | (2006.01) |
| G08G 5/02 | (2006.01) |

(52) U.S. Cl.
CPC .......... *G08G 5/0047* (2013.01); *B64D 43/02* (2013.01); *B64D 45/00* (2013.01); *G06F 3/14* (2013.01); *G08G 5/003* (2013.01); *G08G 5/006* (2013.01); *G08G 5/0034* (2013.01); *G08G 5/0039* (2013.01); *G08G 5/025* (2013.01)

(58) Field of Classification Search
CPC .... G08G 5/0047; G08G 5/003; G08G 5/0034; G08G 5/0039; G08G 5/006; G08G 5/025; B64D 43/02; B64D 45/00; G06F 3/14
See application file for complete search history.

(56) References Cited

U.S. PATENT DOCUMENTS

| 4,086,632 A * | 4/1978 | Lions ..................... G01C 21/36 |
| | | 345/157 |
| 6,085,129 A | 7/2000 | Schardt et al. |
| 6,892,118 B1 | 5/2005 | Feyereisen |
| 7,256,710 B2 | 8/2007 | Mumaw et al. |
| 9,132,913 B1 * | 9/2015 | Shapiro ................ G08G 5/0086 |

(Continued)

*Primary Examiner* — Dale W Hilgendorf
(74) *Attorney, Agent, or Firm* — Lorenz & Kopf LLP

(57) ABSTRACT

A method is provided for displaying information on a display device of an aircraft. The method comprises determining, by the processor, a first point along a flight path when a flight mode associated with a flight plan will be armed; determining, by the processor, a second point along the flight path when the flight mode associated with the flight plan will be engaged; determining, by the processor, a third point along the flight path when the flight mode associated with the flight plan will be disengaged; generating, by the processor, graphics data that represents the first point, the second point and the third point; incorporating, by the processor, the graphics data into a user interface that displays the flight path; and generating, by the processor, the user interface for display on the display device of the aircraft.

20 Claims, 8 Drawing Sheets

(56) References Cited

U.S. PATENT DOCUMENTS

| | | | |
|---|---|---|---|
| 10,252,814 B2 | 4/2019 | Rudolph et al. | |
| 10,546,504 B2 | 1/2020 | Riedinger et al. | |
| 11,056,011 B2* | 7/2021 | Cazaux | G01C 23/005 |
| 2004/0059474 A1 | 3/2004 | Boorman et al. | |
| 2005/0085959 A1 | 4/2005 | Feyereisen | |
| 2008/0125962 A1* | 5/2008 | Wipplinger | G01C 23/005 |
| | | | 701/533 |
| 2010/0324812 A1* | 12/2010 | Sacle | G01C 21/00 |
| | | | 701/467 |
| 2013/0211632 A1* | 8/2013 | Caule | G05D 1/0676 |
| | | | 701/3 |
| 2014/0012436 A1* | 1/2014 | Coulmeau | G08G 5/0034 |
| | | | 701/3 |
| 2015/0262490 A1* | 9/2015 | Deker | G05D 1/101 |
| | | | 701/3 |
| 2016/0085239 A1* | 3/2016 | Boyer | G05D 1/0676 |
| | | | 701/5 |
| 2016/0180715 A1* | 6/2016 | Burke | G08G 5/0091 |
| | | | 701/467 |
| 2017/0291691 A1* | 10/2017 | Barral | B64D 45/00 |
| 2017/0349295 A1* | 12/2017 | Pepitone | G09G 5/02 |
| 2018/0149493 A1 | 5/2018 | Bleeg et al. | |
| 2019/0265731 A1 | 8/2019 | Mathan et al. | |
| 2019/0362635 A1* | 11/2019 | Cazaux | G08G 5/006 |
| 2020/0160731 A1* | 5/2020 | De Villele | G01C 23/005 |
| 2020/0168104 A1* | 5/2020 | Holder | B64D 45/00 |

* cited by examiner

METHODS AND SYSTEMS FOR REPRESENTING FLIGHT MODE ANNUNCIATION INFORMATION ON A COCKPIT DISPLAY

CROSS REFERENCE TO RELATED APPLICATION

This application claims priority to Indian Provisional Patent Application No. 202011033473, filed Aug. 5, 2020, the entire content of which is incorporated by reference herein.

TECHNICAL FIELD

The present disclosure generally relates to methods and systems for presenting flight mode information to a pilot.

BACKGROUND

Aircraft displays include Flight Mode Annunciation (FMA) information. The FMA information includes a listing of the currently engaged modes, the currently armed mode, and the currently disengaged mode. The display of the FMA information includes textual list. Monitoring of the list alone does not provide complete situational awareness, since there is no graphical representation or guidance how and when the mode will be armed, engaged, and disengaged along the flight path. Lack of situational awareness leads to high workload, controlled flight into terrain, runway overrun, hard landing etc.

Hence, there is a need for improved systems and methods for presenting FMA information to the pilot in the aircraft. Other desirable features and characteristics will become apparent from the subsequent detailed description and the appended claims, taken in conjunction with the accompanying drawings and the foregoing technical field and background.

BRIEF SUMMARY

A method is provided for displaying information on a display device of an aircraft. The method comprises determining, by the processor, a first point along a flight path when a flight mode associated with a flight plan will be armed; determining, by the processor, a second point along the flight path when the flight mode associated with the flight plan will be engaged; determining, by the processor, a third point along the flight path when the flight mode associated with the flight plan will be disengaged; generating, by the processor, graphics data that represents the first point, the second point and the third point; incorporating, by the processor, the graphics data into a user interface that displays the flight path; and generating, by the processor, the user interface for display on the display device of the aircraft.

A system is provided for displaying information on a display device of an aircraft. The system includes an information datastore that stores flight mode annunciation information; and a computer module that, by a processor, that receives the flight mode annunciation information based thereon determines a first point along a flight path when a flight mode associated with a flight plan will be armed, determines a second point along the flight path when the flight mode associated with the flight plan will be engaged, determines a third point along the flight path when the flight mode associated with the flight plan will be disengaged, generates graphics data that represents the first point, the second point and the third point, incorporates the graphics data into a user interface that displays the flight path, and generates the user interface for display on the display device of the aircraft.

Furthermore, other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following figures, wherein like numerals denote like elements, and wherein.

DETAILED DESCRIPTION

The following detailed description is merely exemplary in nature and is not intended to limit the disclosure or the application and uses of the disclosure. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
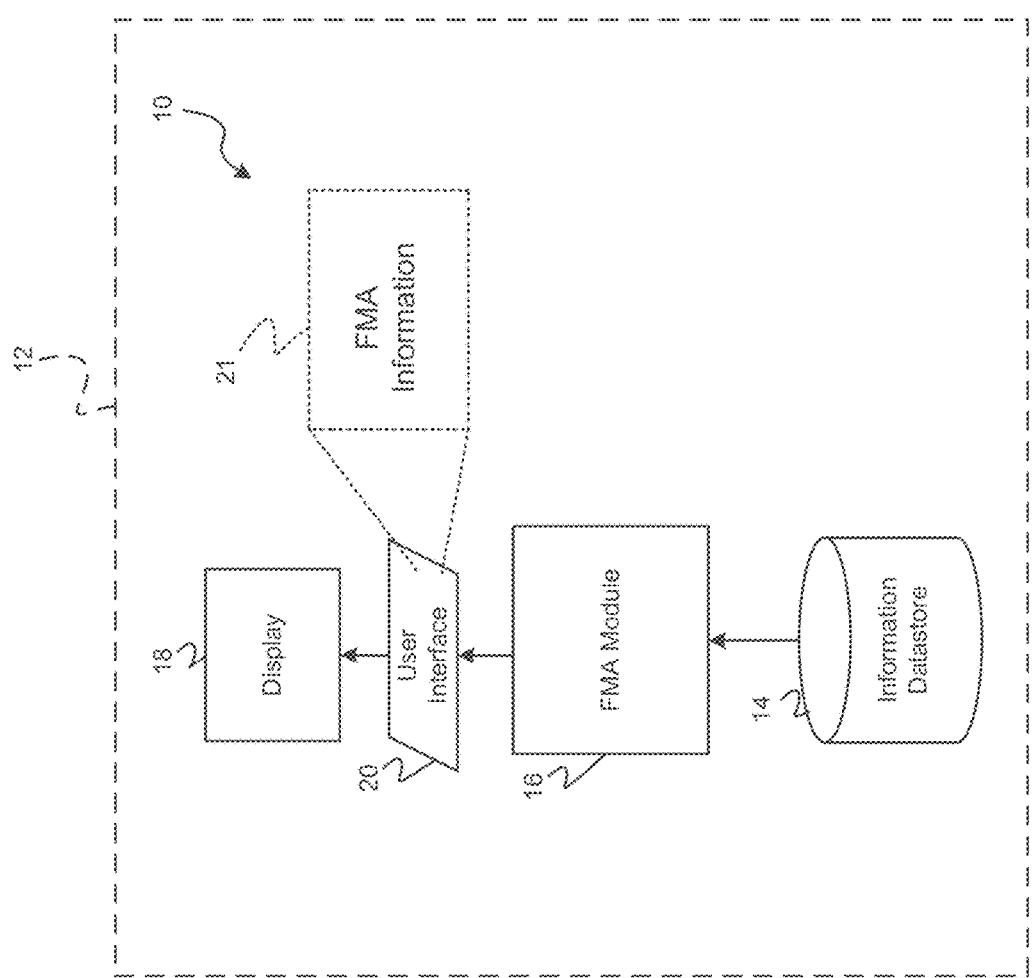
FIG. 1 is a functional block diagram illustrating a flight mode annunciation (FMA) system for an aircraft in accordance with exemplary embodiments.

Referring now to FIG. 1, exemplary embodiments of the present disclosure are directed to a flight mode annunciation (FMA) system shown generally at 10 that is associated with an aircraft 12. As can be appreciated, the FMA system 10 described herein can be implemented in any aircraft 12 having onboard a computing device that is associated with a display device, where the computing device includes at least a processor, and one or more data storage devices.

As shown in FIG. 1, the FMA system 10 includes, but is not limited to, an information datastore 14, an FMA module 16, and a display 18. The information datastore 14 stores information pertaining to current flight modes. As can be appreciated, the information datastore 14 may reside in a data storage device of the computing device on the aircraft 12, may reside in a data storage device on a computing device at a location remote from the aircraft 12 (e.g., on a central server), or may partially reside on the computing device of the aircraft 12 and partially on the computing device at the location remote from the aircraft 12.

The FMA module 16 may include one or more instructions embedded in a computer readable medium and that may be executed by the processor of the computing device. The instructions of FMA module 16 access the information datastore 14, determine FMA information 21, and generate a user interface 20 having the FMA information 21 represented in a graphical format. As can be appreciated, depending on the location of the information datastore 14, the FMA module 16 may communicate with the information datastore 14 directly, and/or may communicate with the information datastore 14 indirectly through one or more communication protocols.

The display 18 displays the user interface 20. The display 18 may be located in a cockpit of the aircraft 12 for viewing by, for example, a pilot of the aircraft 12. In various embodiments, the user interface 20 may automatically display the FMA information 21 based on flight conditions of the aircraft 12. In various other embodiments, a pilot may interact with the user interface 20 to display the FMA information 21 using one or more input devices of the computing system.

Figure 2:
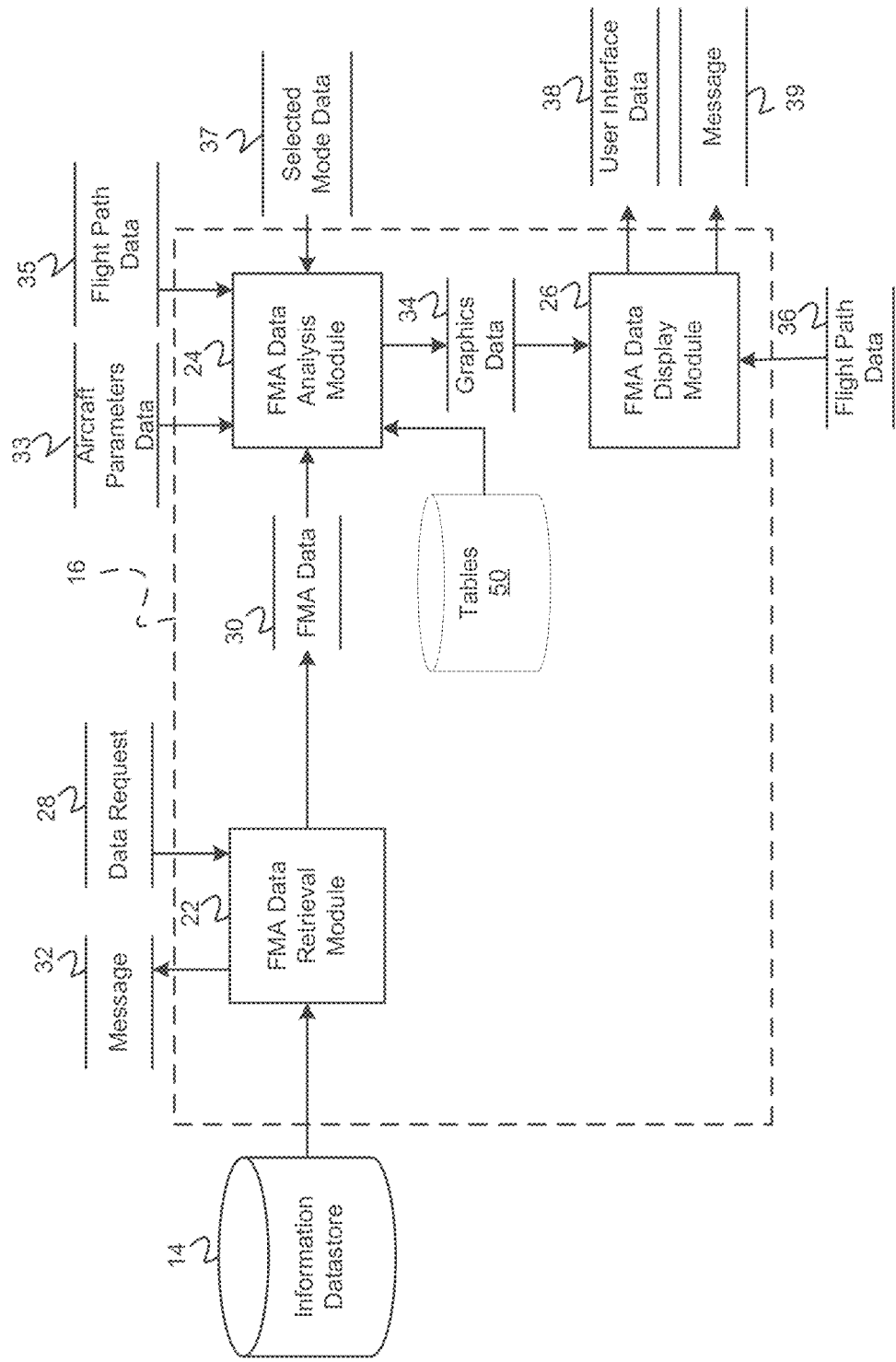
FIG. 2 is dataflow diagram illustrating an FMA module that communicates with an information datastore of the FMA system in accordance with exemplary embodiments.

Referring now to FIG. 2 and with continued reference to FIG. 1, a dataflow diagram illustrates various embodiments of the FMA module 16 of the FMA system 10. Various embodiments of FMA systems 10 according to the present disclosure may include any number of sub-modules embedded within the FMA module 16. As can be appreciated, the sub-modules shown in FIG. 2 may be combined and/or further partitioned to similarly determine and display FMA information 21. Inputs to the FMA module 16 may be received from other modules (not shown), determined/modeled by other sub-modules (not shown) within the FMA module 16, and/or may be user input that is based on a user interacting with the user interface 20. In various embodiments, the FMA module 16 includes an FMA data retrieval module 22, an FMA data analysis module 24, and an FMA data display module 26.

The FMA data retrieval module 22 receives as input a data request 28. The data request 28 includes some indication that the FMA information 21 is desired. When the FMA information 21 is desired, the FMA data retrieval module 22 retrieves FMA data 30 associated with the current flight conditions from the information datastore 14. For example, when the aircraft 12 is operating in a prescribed envelop, certain modes are armed, engaged, and disengaged. These modes are stored in and retrieved from the information datastore 14 as the FMA data 30. If the FMA data 30 is not available or there are no current operating modes, the FMA data retrieval module 22 generates a notification message 32 indicating no data in response to the request 28.

In various embodiments, the FMA data 30 includes current operation modes and their respective armed, engaged, and disengaged status. For example, a primary flight display (PFD) system determines the current operation modes including the engaged, disengaged, and armed status and stores an indication of the current operation modes and their status in the information datastore 14. In various embodiments, the operation modes can be any one of a vertical navigation mode, a lateral navigation mode, a vertical angle deviation mode, and a lateral angle deviation mode. Examples of vertical navigation modes include, but are not limited to, altitude hold (ALT), altitude Select (ALTS), glideslope (GLS), and vertical navigation (VNAV). Examples of lateral navigation modes include, but are not limited to, flight management system (FMS), VHF omni direction radio (VOR), localizer (LOC), distance measuring equipment (DME), microwave landing system (MLS), and global positioning System (GPS) modes. Examples of throttle modes include, but are not limited to, speed (SPD) and time navigation (TNAV).

The FMA data analysis module 24 receives as input the FMA data 30, aircraft parameters data 33, designated flight path data 35, and a selected mode data 37. In various embodiments, the designated flight path data 35 includes the predicated flight path (e.g., vertical, lateral, etc.) given the current aircraft conditions. In various embodiments, the selected mode data 37 includes data indicating the mode or modes selected to graphically present the status associated with the flight path. In various embodiments, the aircraft parameters data 33 includes data indicating the current operating conditions of the aircraft 12 and that are associated with the selected mode or modes.

The FMA data analysis module 24 analyzes the received data to determine graphics data 34. The graphics data 34 includes data that defines graphical representations and locations of visual aids that may be incorporated into the user interface 20 to graphically illustrate the FMA information 21 for the selected mode relative to the designated flight path. For example, the FMA data analysis module 24 evaluates the current aircraft parameters data 33, and the designated flight path data 35 to predict when, along the designated path the selected mode will be engaged, disengaged and armed.

In various embodiments, tables 50 defining each flight mode status and their associated conditions can be predefined and evaluated by the FMA data analysis module 24. The received aircraft parameters data 33 is then evaluated based on the defined conditions of the tables 50 to determine a point when the mode is to be engaged, disengaged, and/or armed. In various embodiments, the point indicates a speed along a flight path, a time along a flight path, an angle along a flight path, and/or an angular deviation along a flight path.

Figure 3:
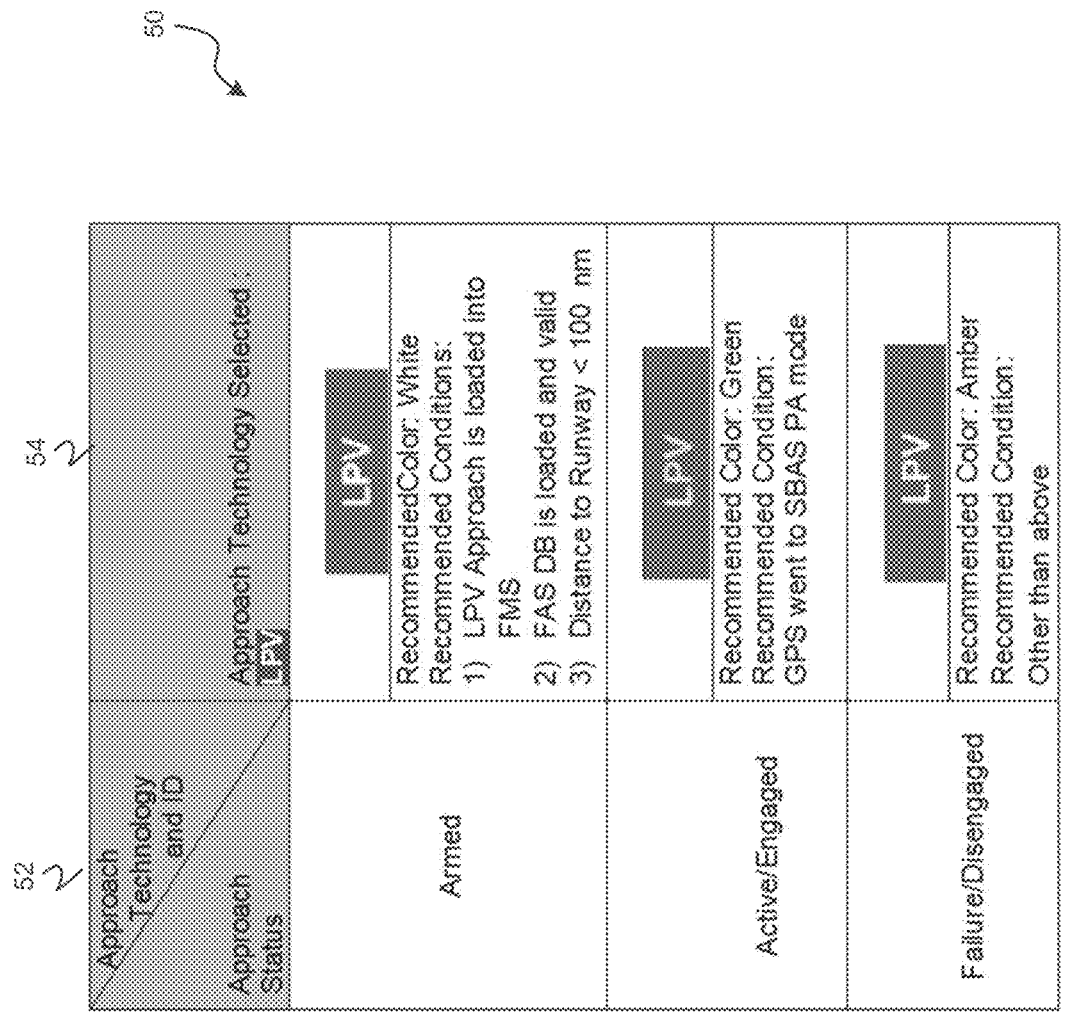
FIG. 3 is a table that is defined and used by the FMA module in accordance with exemplary embodiments.

For example, FIG. 3 illustrates an exemplary table 50 that is defined for an exemplary vertical mode. The status is defined in the first column 52 and the associated conditions and graphics are defined in the second column 54. As can be appreciated, tables 50 can be defined for all of the modes, as conditions associated for each mode and each status of each mode can vary, in various embodiments.

Figure 4A:
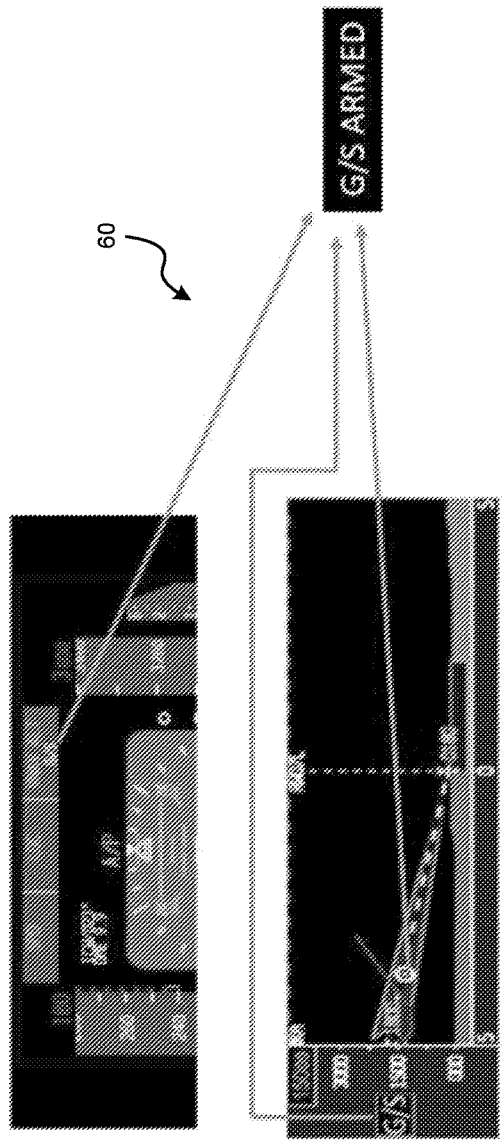
FIGS. 4A, 4B, 4C, 4D, and 4E are illustrations of user interfaces that may be generated by the FMA module and displayed on a display device of the aircraft in accordance with exemplary embodiments.
Figure 4B:
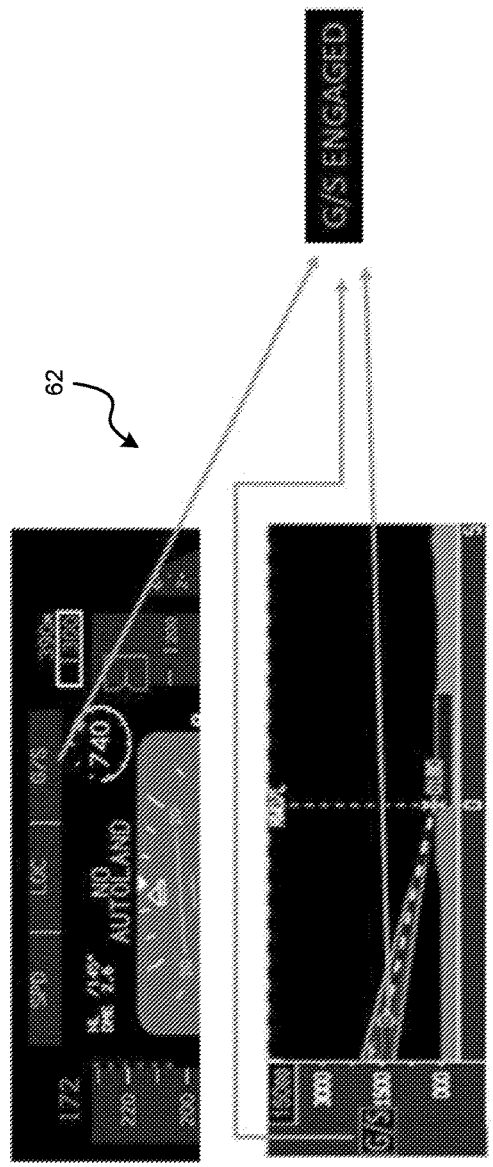

In various embodiments, tables 50 can be defined for various flight path types for each mode, as the conditions associated with the flight path type can vary in various embodiments. For example, as shown in FIGS. 4A and 4B, the armed and engaged status of the glide slope (G/S) mode is displayed at points along vertical profiles 60, 62 of the flight path corresponding to when they will be engaged and armed. The FMA data analysis module 24 determines the point along this flight path corresponding to when the mode is expected to be engaged for the vertical flight path type based on the conditions defined in a table 50 associated with the G/S mode.

Once the points are determined, the FMA data analysis module 24 selects a graphic to illustrate the status. In various embodiments, a color and/or a shape of a graphic can be associated with each status and defined in the table 50. For example, the graphic representing the armed status can be displayed as a white circle and the graphic representing the engaged status can be displayed as a green circle. As can be appreciated, any shape and/or color combination can be associated with each status as the embodiments are not limited to the present examples.

Figure 4C:
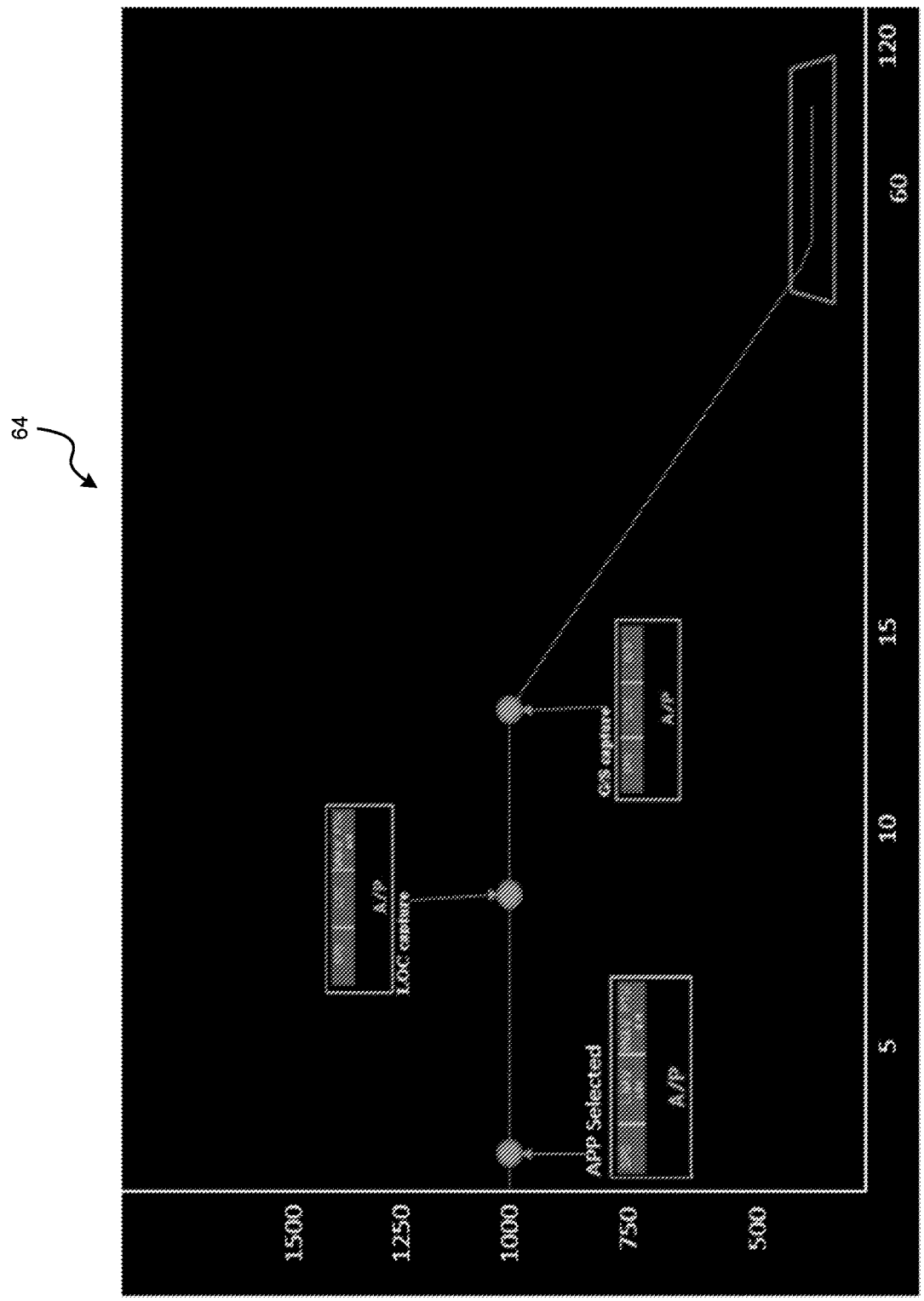

In another example, as shown in FIG. 4C, points associated with an armed status, a disengaged status, and/or an engaged status of various related modes are displayed at points along another vertical profile 64 of the flight path corresponding to when the modes will be engaged, armed, and/or disengaged. The FMA data analysis module 24 determines the points along the flight path corresponding to when the modes are expected to be engaged, disengaged and armed for the vertical flight path type based on the conditions defined in tables 50 associated with each of the modes.

Once the points are determined, the FMA data analysis module selects graphic to illustrate the status. In various embodiments, a color and/or a shape of a graphic can be associated with each point and defined in the tables 50. For example, the graphic representing the points can be displayed as a blue dot having an arrow pointing from a text box (containing the modes and status) to the blue dot. As can be appreciated, any shape and/or color combination can be associated with each point as the embodiments are not limited to the present examples.

Figure 4D:
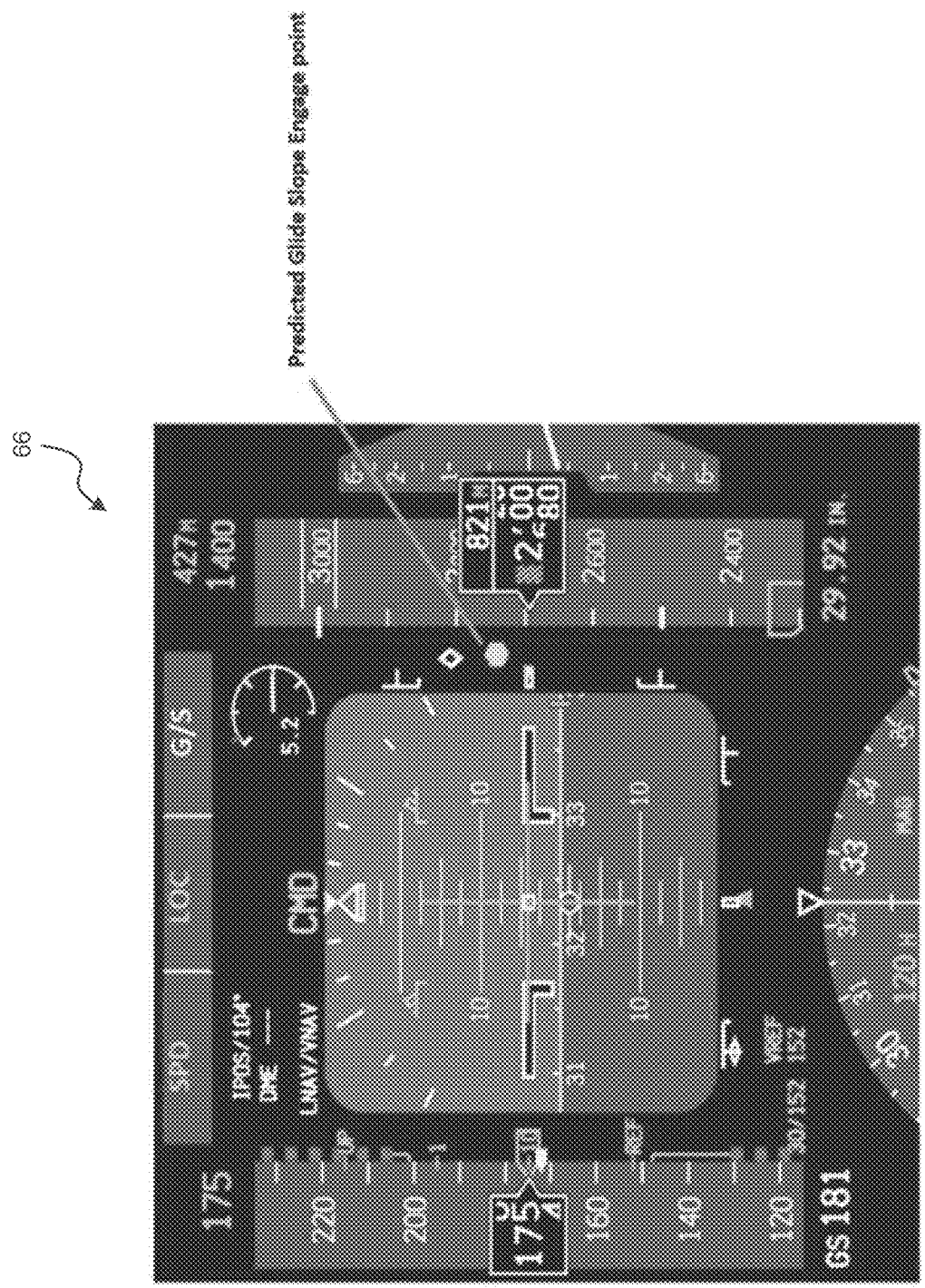

In another example, as shown in FIG. 4D, the armed and engaged status of the G/S mode is displayed at points along a glide slope scale 66 of the flight path corresponding to when the mode will be engaged. The FMA data analysis module 24 determines the point along the flight path corresponding to when the mode is expected to be engaged type based on the conditions defined in a table 50 associated with the G/S mode.

Once the point is determined, the FMA data analysis module 24 selects a graphic to illustrate the status. In various embodiments, a color and/or a shape of a graphic can be associated with the status. For example, the graphic representing the engaged status can be displayed as a green dot. As can be appreciated, any shape and/or color combination can be associated with each status as the embodiments are not limited to the present examples.

Figure 4E:
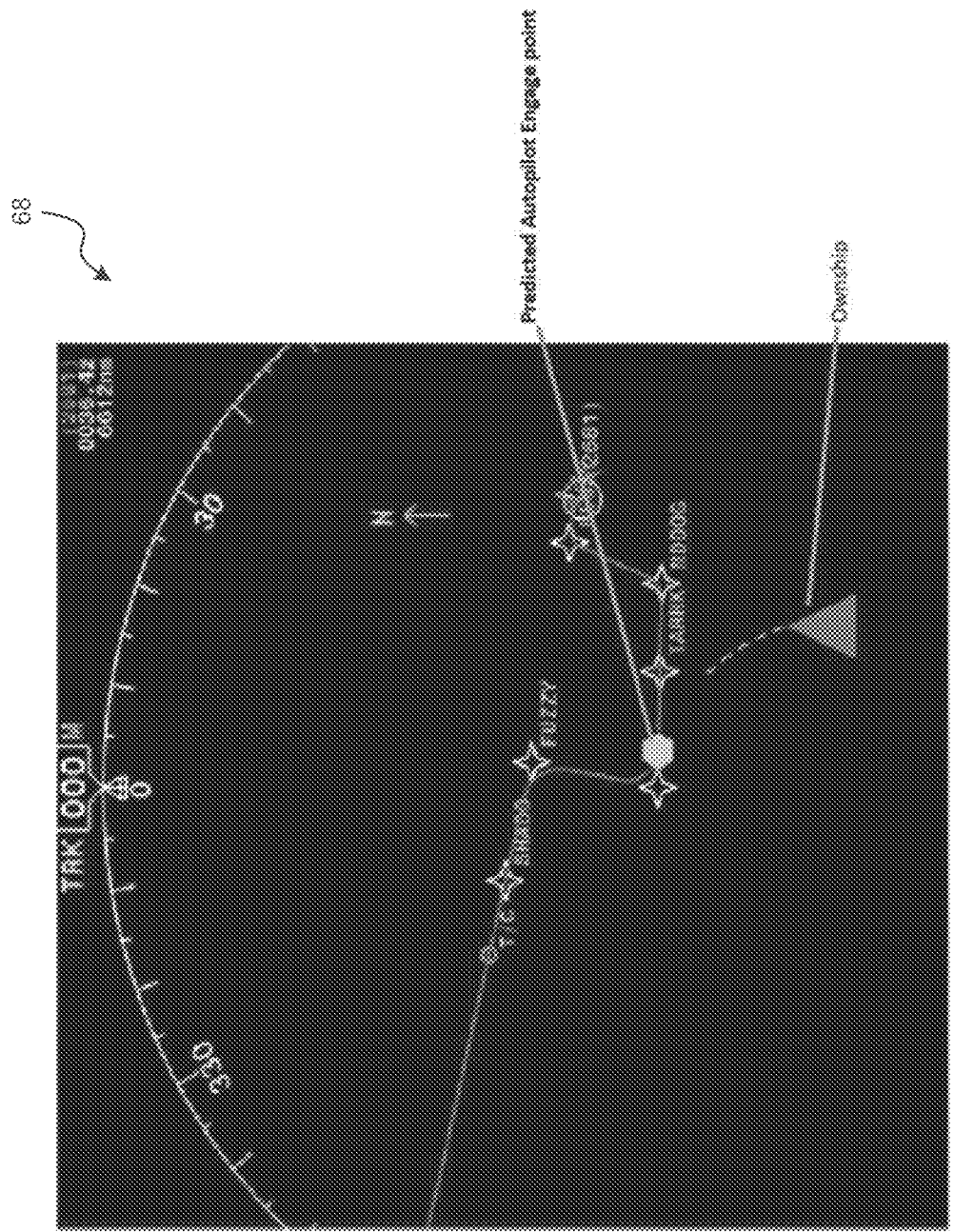

In another example, as shown in FIG. 4E, the engaged status of an autopilot mode is displayed at a point along a lateral profile 68 of the flight path corresponding to when the mode will be engaged. The FMA data analysis module 24 determines the point along the flight path corresponding to when the mode is expected to be engaged type based on the conditions defined in a table 50 associated with the autopilot mode.

Once the point is determined, the FMA data analysis module 24 selects a graphic to illustrate the status. In various embodiments, a color and/or a shape of a graphic can be associated with the status. For example, the graphic representing the engaged status can be displayed as a green dot. As can be appreciated, any shape and/or color combination can be associated with each status as the embodiments are not limited to the present examples.

With reference back to FIG. 2, the FMA data display module 26 receives as input the graphics data 34 and flight path data 36. The flight path data 36 can include data for displaying the flight path and other information associated with the aircraft 12. As illustrated in FIGS. 4A-4E, the flight path data can include, for example, but is not limited to, a vertical map, a lateral map, and a perspective map (e.g., altitude tape, vertical situation display, deviation scales, etc.).

The FMA data display module 26 generates user interface data 38 to display the graphics data 34 in relation to the flight path data 36. For example, the FMA data display module 26 incorporates the graphics data 34 into the flight path data 36 by overlaying the graphics data 34 on the flight path data 36 to display FMA information 21 on the flight path itself. In another example, the FMA data display module 26 incorporates the graphics data 34 by adding the graphics data 34 to the flight path data 36 to display the FMA information 21 at a location adjacent to the flight path (e.g., in another area of the display 18).

The FMA data display module 26 analyzes the graphics data 34 to determine which aids to display and how to display the aids (e.g., at what location and what orientation). If sufficient data is not available to directly determine how to display the aids, the FMA data analysis module 24 may determine how to display the aids using one or more data analysis methods that take into account other available data. When the graphics data 34 indicates a point in the user interface not currently displayed, the FMA data display module 26 generates a notification message 39 indicating that the point is not within the field of view, and optionally selects a point (at a border or some other location) within the interface to display the point with a unique graphic. When changes to a mode are not honored due to interdependency between flight modes, the notification message 39 can be sent to notify crew members.

Figure 5:
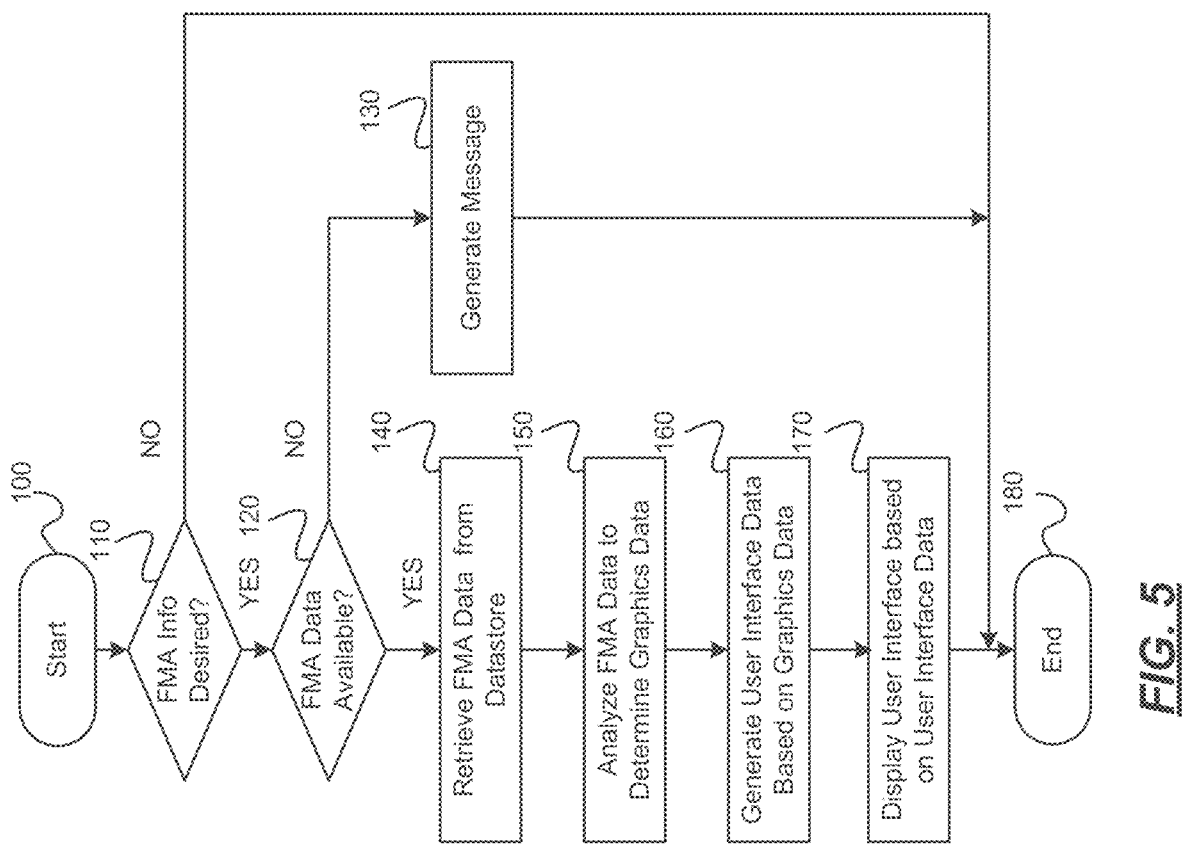
FIG. 5 is a flowchart illustrating an information display method that may be performed by the FMA module in accordance with exemplary embodiments.

Referring now to FIG. 5, and with continued reference to FIGS. 1 through 4E, a flowchart illustrates a display method that can be performed by the FMA module 16 of FIGS. 1 and 2 in accordance with the present disclosure. As can be appreciated in light of the disclosure, the order of operation within the method is not limited to the sequential execution as illustrated in FIG. 5 but may be performed in one or more varying orders as applicable and in accordance with the present disclosure.

In various embodiments, the method can be scheduled to run based on predetermined events, and/or can run continually during operation of the computing device of the aircraft 12.

The method may begin at 100. It is determined whether the data request 28 is received indicating that FMA information 21 is desired at 110. If FMA information 21 is not desired at 110, the method may end at 180.

If, however, the FMA information 21 is desired, it is determined whether FMA data 30 is available for the current prescribed envelop from the information datastore 14 at 120. If FMA data 30 is not available at 120, the message 32 may be generated indicating such at 130 and the method may end at 180.

If, however, FMA data 30 is available at 120, the FMA data 30 is retrieved from the information datastore 14 at 140. The FMA data 30 is analyzed, for example, as discussed above, to determine when the selected mode is to be engaged, disengaged and armed along the flight path and to generate the graphics data 34 based thereon at 150. The user interface data 38 is generated based on the graphics data 34 at 160. The user interface 20 is displayed based on the user interface data 38 at 170. Thereafter, the method may end at 180.

Those of skill in the art will appreciate that the various illustrative logical blocks, modules, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality.

Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of displaying information on a display device of an aircraft, comprising:
    storing, in a datastore, conditions associated with a flight mode, the conditions being used to determine when the flight mode will be armed, when the flight mode will be engaged, and when the flight mode will be disengaged, wherein the flight mode is at least one of a vertical navigation mode, a lateral navigation mode, a vertical angle deviation mode, and a lateral angle deviation mode;
    while the aircraft is in flight:
    determining, by a processor, a first point along a flight path when the flight mode will be armed;
    determining, by the processor, a second point along the flight path when the flight mode will be engaged;
    determining, by the processor, a third point along the flight path when the flight mode will be disengaged;
    generating, by the processor, graphics data that represents the first point, the second point and the third point;
    incorporating, by the processor, the graphics data into a user interface in relation to the flight path that is displayed; and
    generating, by the processor, the user interface for display on the display device of the aircraft.

2. The method of claim 1 wherein the first point, the second point, and the third point indicate a vertical distance along the flight path.

3. The method of claim 1 wherein the first point, the second point, and the third point indicate a lateral distance along the flight path.

4. The method of claim 1 wherein the first point, the second point, and the third point indicate an angle along the flight path.

5. The method of claim 1 wherein the first point, the second point, and the third point indicate a time along the flight path.

6. The method of claim 1, wherein the first point, the second point, and the third point indicate a speed along the flight path.

7. The method of claim 1, wherein the first point, the second point, and the third point indicate an angular deviation along the flight path.

8. The method of claim 1, further comprising displaying a message to alert a crew member when changes are not honored due to interdependency between flight modes.

9. The method of claim 1, further comprising displaying a message when at least one of the first point, the second point, and a third point is not within a field of view.

10. The method of claim 9, further comprising displaying, by the processor, the at least one of the first point, the second point and the third point that is not within the field of view at a location within the field of view.

11. A system for displaying information on a display device of an aircraft, comprising:
    an information datastore that stores flight mode annunciation information;

a second information datastore that stores conditions associated with a flight mode, the conditions being used to determine when the flight mode will be armed, when the flight will be engaged, when the flight mode will be disengaged, wherein the flight mode is at least one of a vertical navigation mode, a lateral navigation mode, a vertical angle deviation mode, and a lateral angle deviation mode; and a computer module that, by a processor and while the aircraft is in-flight, receives the flight mode annunciation information and based thereon determines a first point along a flight path when the flight mode will be armed, determines a second point along the flight path when the flight mode will be engaged, determines a third point along the flight path when the flight mode will be disengaged, generates graphics data that represents the first point, the second point and the third point, incorporates the graphics data into a user interface in relation to the flight path that is displayed, and generates the user interface for display on the display device of the aircraft.

12. The system of claim 11 wherein the first point, the second point, and the third point indicate a vertical distance along the flight path.

13. The system of claim 11, wherein the first point, the second point, and the third point indicate a lateral distance along the flight path.

14. The system of claim 11, wherein the first point, the second point, and the third point indicate an angle along the flight path.

15. The system of claim 11, wherein the first point, the second point, and the third point indicate a time along the flight path.

16. The system of claim 11, wherein the first point, the second point, and the third point indicate a speed along the flight path.

17. The system of claim 11, wherein the first point, the second point, and the third point indicate an angular deviation along the flight path.

18. The system of claim 11, wherein the computer module is further configured to display a message to a crew member when changes are not honored due to interdependency between flight modes.

19. The system of claim 11, wherein the computer module is further configured to display a message when at least one of the first point, the second point, and a third point is not within a field of view.

20. The system of claim 19, wherein the computer module is further configured to display the at least one of the first point, the second point and the third point that is not within the field of view at a location within the field of view.

* * * * *